(12) United States Patent
Uno

(10) Patent No.: US 9,964,262 B2
(45) Date of Patent: May 8, 2018

(54) LIGHTING DEVICE, DISPLAY DEVICE, AND TELEVISION DEVICE

(71) Applicant: Sharp Kabushiki Kaisha, Sakai, Osaka (JP)

(72) Inventor: Makoto Uno, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days. days.

(21) Appl. No.: 15/553,659

(22) PCT Filed: Mar. 15, 2016

(86) PCT No.: PCT/JP2016/058091
§ 371 (c)(1),
(2) Date: Aug. 25, 2017

(87) PCT Pub. No.: WO2016/158371
PCT Pub. Date: Oct. 6, 2016

(65) Prior Publication Data
US 2018/0045384 A1     Feb. 15, 2018

(30) Foreign Application Priority Data
Apr. 1, 2015   (JP) ................................. 2015-074897

(51) Int. Cl.
*F21V 9/00*      (2018.01)
*F21K 9/64*      (2016.01)
(Continued)

(52) U.S. Cl.
CPC .................. *F21K 9/64* (2016.08); *F21K 9/61* (2016.08); *F21V 9/16* (2013.01); *F21V 9/30* (2018.02);
(Continued)

(58) Field of Classification Search
USPC ........................................................ 362/231
See application file for complete search history.

(56) References Cited

U.S. PATENT DOCUMENTS 8,343,575 B2   1/2013   Dubrow
8,697,471 B2   4/2014   Dubrow
(Continued)

FOREIGN PATENT DOCUMENTS

JP        2013-544018 A        12/2013

*Primary Examiner* — Rafferty Kelly
(74) *Attorney, Agent, or Firm* — Keating & Bennett, LLP

(57) ABSTRACT

A lighting unite according to an embodiment includes a light source, a light guide plate, and a wavelength converting member. The light source is configured to emit primary light rays. The light guide plate includes a light entering surface through which the primary light rays enter, a light exiting surface through which the primary light rays exit, and a light reflecting and scattering pattern. The light reflecting and scattering pattern includes complementary color dots formed in edge areas of the opposite surface and white dots formed inner than the complementary color dots. The complementary color dots absorb primary light rays and exhibit a color that makes a complementary color pair with a reference color exhibited by the primary light rays. The white dots exhibit white color. The wavelength converting member covers the light exiting surface and passes some of the primary light rays to emit planar light.

15 Claims, 10 Drawing Sheets

(51) Int. Cl.
*G02B 5/20* (2006.01)
*F21V 9/16* (2006.01)
*F21K 9/61* (2016.01)
G02F 1/1335 (2006.01)
F21Y 115/10 (2016.01)

(52) U.S. Cl.
CPC ......... *G02B 5/20* (2013.01); *G02F 1/133603* (2013.01); *F21Y 2115/10* (2016.08); *G02F 1/133608* (2013.01); *G02F 2001/133613* (2013.01)

(56) References Cited

U.S. PATENT DOCUMENTS

| | | |
|---|---|---|
| 9,139,767 B2 | 9/2015 | Dubrow |
| 9,199,842 B2 | 12/2015 | Dubrow et al. |
| 2010/0167011 A1 | 7/2010 | Dubrow |
| 2012/0113672 A1 | 5/2012 | Dubrow et al. |
| 2013/0075014 A1 | 3/2013 | Dubrow |
| 2014/0029239 A1* | 1/2014 | Oh ................ G02B 5/0242 362/84 |
| 2014/0178648 A1 | 6/2014 | Dubrow |
| 2015/0300600 A1 | 10/2015 | Dubrow et al. |
| 2016/0009988 A1 | 1/2016 | Dubrow |
| 2016/0349428 A1 | 12/2016 | Dubrow et al. |
| 2016/0363713 A1 | 12/2016 | Dubrow et al. |

* cited by examiner

LIGHTING DEVICE, DISPLAY DEVICE, AND TELEVISION DEVICE

TECHNICAL FIELD

The present invention relates to a lighting device, a display device, and a television device.

BACKGROUND ART

A liquid crystal display device includes a liquid crystal panel and a lighting unit (a backlight unit) configured to supply light to the liquid crystal panel. As an example of such a backlight unit, an edge light type backlight unit (or a side light type backlight unit) has been known. In such a backlight unit, light emitting diodes (LEDs) are disposed along an end surface of a light guide plate. Such a backlight unit is disposed behind the liquid crystal panel to supply planar light to the back surface of the liquid crystal panel.

Recently, a lighting device including a phosphor sheet that is an optical member that covers a light guide plate is known (e.g., Patent Document 1). The phosphor sheet contains quantum dot phosphors. In such a lighting device, some of primary light rays emitted by LEDs (e.g., blue light rays) which reach the phosphor sheet excite the quantum dot phosphors in the phosphor sheet and the rest of the light rays pass through the phosphor sheet. When the quantum dot phosphors are excited by the primary light rays, the quantum dot phosphors emit secondary light rays with wavelengths different from those of the primary light rays (e.g., green light rays and red light rays). The secondary light rays exiting from the phosphor sheet are mixed with the primary light rays passing through the film, resulting in emission of white light from the phosphor sheet.

In a lighting device of this kind, optical sheets including a lens sheet and a reflective type polarizing sheet are disposed over a phosphor sheet. Therefore, light rays exiting the light guide plate through a light exiting surface are repeatedly retroreflected by the optical sheets or other components to travel toward a back surface of a display panel. Namely, the light rays exiting the light guide plate through the light exiting surface are directed to the phosphor sheet for multiple times. With the quantum dot phosphors in the phosphor sheet, the light rays are efficiently converted to light rays with other wavelengths.

RELATED ART DOCUMENT

Patent Document

Patent Document 1: Japanese Translation of PCT international Application Publication No. 2013-544018

Problem to be Solved by the Invention

Light exiting from an edge area (a peripheral area) of the light exiting surface of the lighting device include a larger number of the primary light rays that exit without wavelength conversion in comparison to light exiting from a center area of the light exiting surface of the lighting device. This may be because the light rays in the edge area are retroreflected for the smaller number of times. Therefore, the light exiting from the lighting device may be tinted a color of the primary light rays (e.g., blue) more in the end portions (the peripheral portions) than in the center portion.

DISCLOSURE OF THE PRESENT INVENTION

The present invention was made in view of the above circumstances. An object is to provide a technology for reducing color unevenness in exiting light that is tinted a color of primary light rays from a light source more in end portions than in a center portion of an edge light type lighting device.

Means for Solving the Problem

A lighting device according to the present invention includes a light source, a light guide plate and a wavelength converting member. The light source is configured to emit primary light rays in a predefined wavelength range. The light guide plate includes a light entering surface, a light exiting surface, an opposite surface, and a light reflecting and scattering pattern. The light entering surface through which the primary light rays from the light source enter is opposed to the light source. The primary light rays that have entered the light guide plate through the light entering surface exit through the light exiting surface. The opposite surface is disposed on an opposite side from the light exiting surface. The light reflecting and scattering pattern includes dots having light reflectivity and light scattering properties. The dots are formed on the opposite surface to spread on the opposite surface. The dots include complementary color dots and white dots. The complementary color dots are formed in edge areas of the opposite surface and configured to absorb the primary light rays and exhibit a color that makes a complementary color pair with a reference color exhibited by the primary light rays. The white dots are formed inner of the opposite surface than the complementary color dots and configured to exhibit a white color. The wavelength converting member contains phosphors that are configured to emit secondary light rays in a wavelength range different from the wavelength range when excited by the primary light rays. The wavelength converting member is disposed to cover the light exiting surface and configured to pass some of the primary light rays to emit planar light.

According to the configuration, light exiting from the lighting device (planar light) is less likely to be tinted a color of the primary light rays from the light source more in the end portions than in a center portion, that is, such color unevenness can be reduced.

In the lighting device, the light reflecting and scattering pattern may be formed such that a density per unit area on the opposite surface gradually increases as a distance from the light entering surface increases.

In the lighting device, the light reflecting and scattering pattern may be formed such that a density per unit area may be higher on a light source non-opposed end surface side closer to a light source non-opposed end surface that may be an end surface of the light guide plate not opposed to the light source than on a light entering surface side.

In the lighting device, the complementary color dots may have tones of color that makes a complementary color pair with the reference color. The tones of color may gradually change from deep to light in directions from edges of the opposite surface toward a center of the opposite surface.

In the lighting device, the complementary color dots may be formed on the opposite surface along edges of the light guide plate.

In the lighting device, the complementary color dots may be formed on the opposite surface along light source non-opposed adjacent end portions including light source non-opposed adjacent end surfaces that are not opposed to the light source and adjacent to the light entering surface.

In the lighting device, the complementary color dots may be arranged in a frame pattern to surround the white dots.

In the lighting device, the complementary color dots may be configured to exhibit a color that makes a complementary color pair with the reference color for an entire area or a partial area.

In the lighting device, each dot of the light reflecting and scattering pattern may include a paint film that contains a coloring agent. Each complementary color dot may include a complementary coloring agent that absorbs the primary light rays and exhibit a color that makes a complementary color pair with a reference color exhibited by the primary light rays.

In the lighting device, the dots of the light reflecting and scattering pattern may be recesses in dot shapes formed in the opposite surface of the light guide plate. The complementary color dots may include the recesses with paints that may absorb the primary light rays and exhibit a color that makes a complementary color pair with a reference color exhibited by the primary light rays.

In the lighting device, the primary color rays may be blue light rays. The wavelength converting member may include at least green phosphors and red phosphors as the phosphors. The green phosphors may be configured to emit green light rays as the secondary light rays when excited by the blue light rays that are the primary light rays. The red phosphors may be configured to emit red light rays as the secondary light rays when exited by the blue light rays that are the primary light rays. The complementary dots may be configured to exhibit an yellow color.

The lighting device may include a reflective type polarizing member disposed to cover the wavelength converting member.

A display device according to the present invention includes the lighting device and a display panel that is configured to display an image using light from the lighting device.

The display panel may be a liquid crystal display panel.

A television device according to the present invention includes the display device.

Advantageous Effect of the Invention

According to the present invention, a technology for reducing color unevenness in exiting light that is tinted a color of primary light rays from a light source more in end portions than in a center portion is provided.

MODE FOR CARRYING OUT THE INVENTION

First Embodiment

A first embodiment of the present invention will be described with reference to FIGS. 1 to 6. In this section, a television device 10TV (an example of a liquid crystal display device 10) including a lighting unit 12 (a backlight unit) will be described. An X-axis, a Y-axis, and a Z-axis are present in some drawings for the purpose of illustration.

Figure 1:
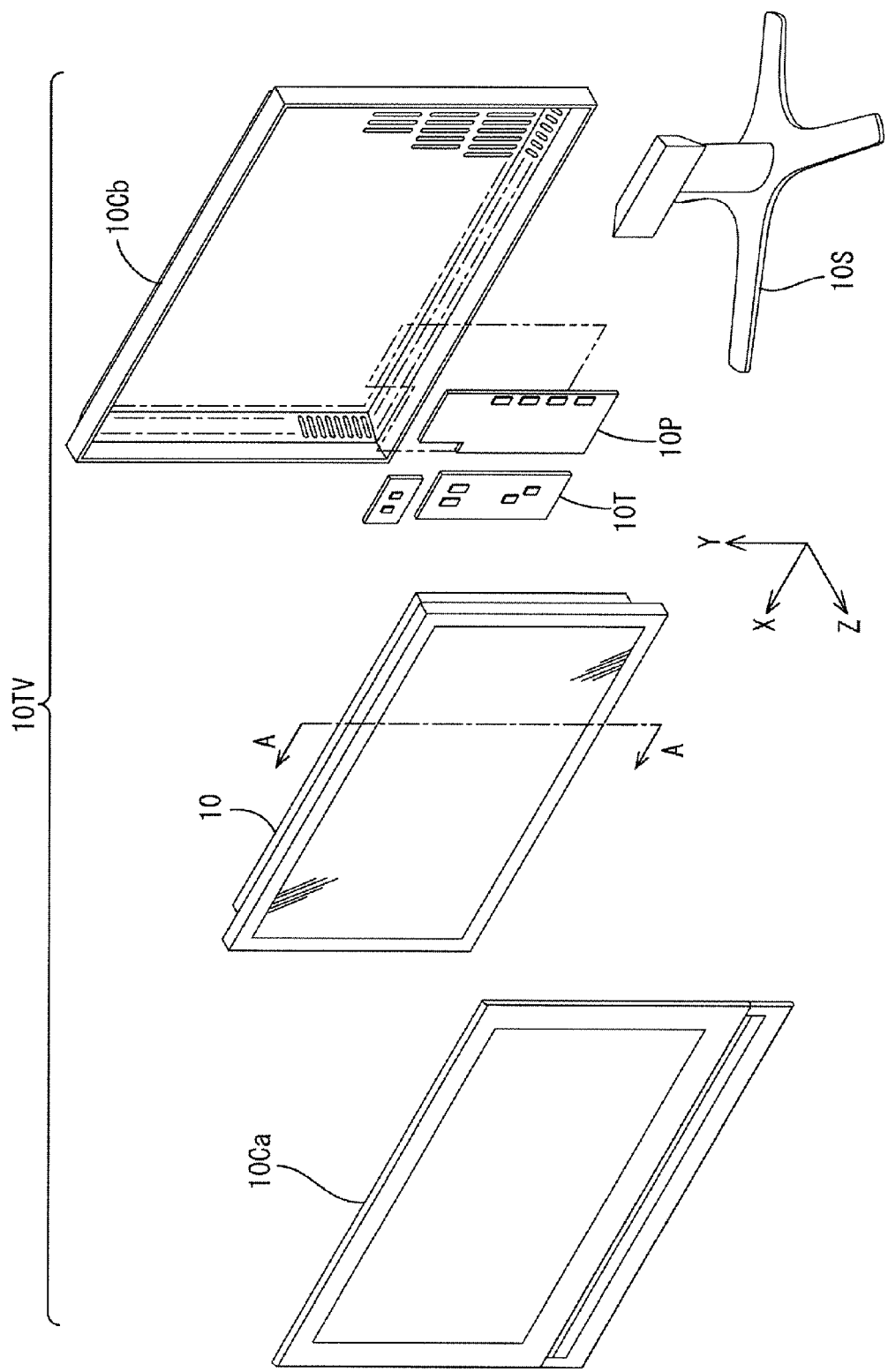
FIG. 1 is an exploded perspective view illustrating a general configuration of a television device according to a first embodiment of the present invention.
Figure 2:
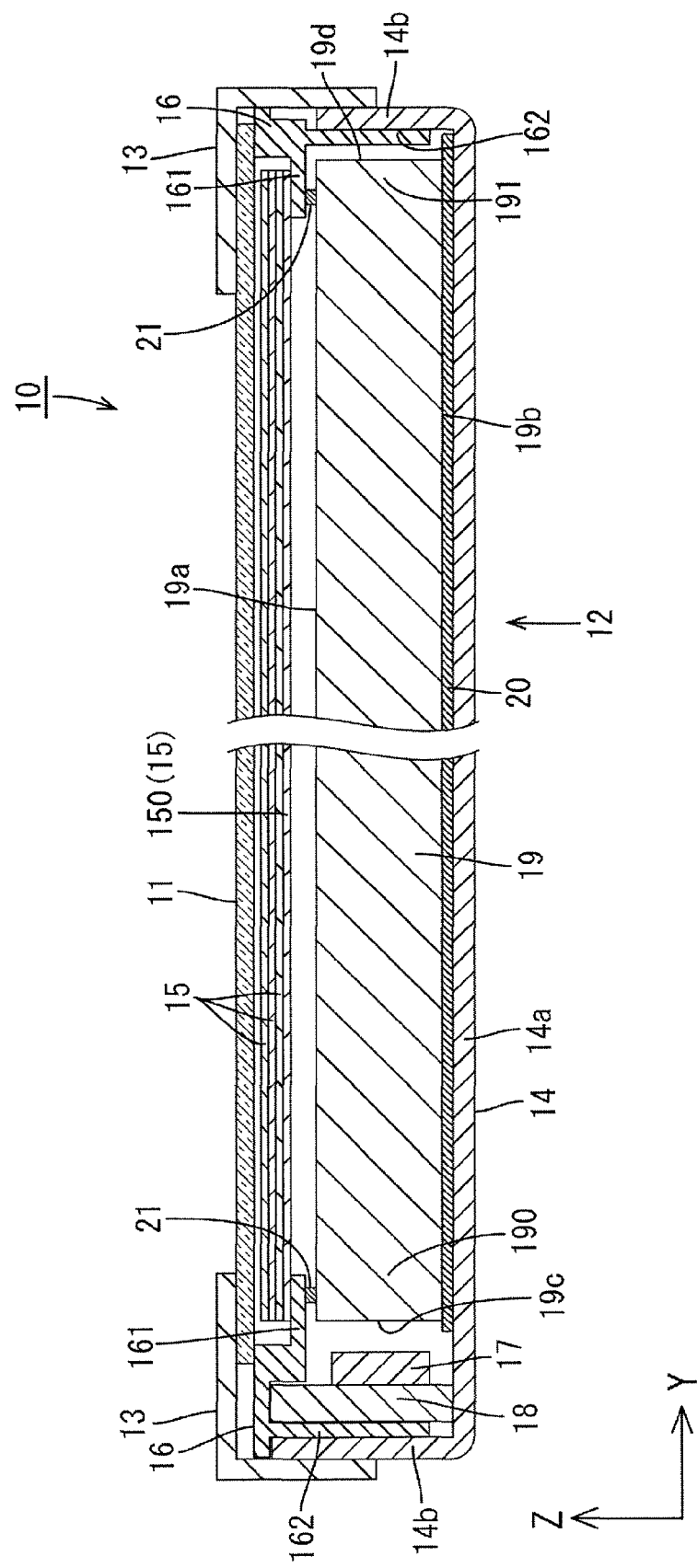
FIG. 2 is a cross-sectional view along line A-A in FIG. 1.

The television device 10TV and the liquid crystal display device 10 will be described. FIG. 1 an exploded perspective view illustrating a schematic configuration of the television device 10TV. FIG. 2 is a cross-sectional view along line A-A in FIG. 1.

As illustrated in FIG. 1, the television device 10TV includes the liquid crystal display device 10 (an example of a display device), a front cabinet 10Ca, a rear cabinet 10Cb, a power supply 10P, a tuner 10T (a receiver), and a stand 10S.

The liquid crystal display device 10 in this embodiment has a horizontally-long rectangular overall shape elongated in the horizontal direction. As illustrated in FIG. 2, the liquid crystal display device 10 mainly includes a liquid crystal panel 11, the lighting unit 12 (the backlight unit), and a bezel 13. The liquid crystal panel 11 is used as a display panel. The lighting unit 12 is an external light source configured to supply light to the liquid crystal panel 11. The bezel 13 has a frame shape and holds the liquid crystal panel 11 and the lighting unit 12.

The liquid crystal panel 11 includes a pair of transparent boards and a liquid crystal layer sealed between the substrates. The liquid crystal panel 11 is configured to display an image to be visible on a panel surface using the light emitted by the lighting unit 12. The liquid crystal panel 11 has a horizontally-long rectangular shape in a plan view. One of the boards of the liquid crystal panel 11 is an array board including a transparent glass substrate, thin film transistors (TFTs) which are switching components, and pixel electrodes. The TFTs and the pixel electrodes are arranged in a matrix on the substrate. The other board is a color filter (CF) board including a transparent glass substrate and color filters. The color filters include red, green, and blue color filters arranged in a matrix on the glass substrate.

The lighting unit 12 is a device disposed behind the liquid crystal panel 11 for supplying light to the liquid crystal panel 11. The lighting unit 12 is configured to emit white light rays. In this embodiment, the lighting unit 12 is an edge light type (or a side light type) lighting device.

As illustrated in FIG. 2, the lighting unit 12 includes a chassis 14, optical members 15, a frame 16, LEDs 17, an LED board 18, a light guide plate 19, and a reflection sheet 20.

The chassis 14 has a box-like overall shape. The chassis 14 is formed from a metal sheet such as an aluminum sheet and an electro galvanized steel sheet (SECC). The chassis 14 includes a bottom plate 14a and sidewall plates 14b. The bottom plate 14a has a rectangular shape similar to the liquid crystal panel in the plan view. The sidewall plates 14b rise from edges of the bottom plate 14a and surround the bottom plate 14a.

The chassis 14 holds various kinds of components including the LEDs 17, the LED board 18, a reflection sheet 20, the light guide plate 19, and the optical members 15. Circuit boards including a control board and an LED driver board, which are not illustrated, are attached to an external surface of the chassis 14.

The reflection sheet 20 is placed to cover a surface of the bottom plate 14a inside the chassis 14. The reflection sheet 20 (an example of a reflecting member) is a sheet shaped member having light reflectivity. The reflection sheet 20 may be made of white foamed polyethylene terephthalate (an example of a white plastic sheet). The light guide plate 19 is place on the reflection sheet 20 and held in the chassis 14.

The light guide plate 19 is made of transparent synthetic resin having high light transmissivity and a refraction index sufficiently higher than that of air (e.g., acrylic resin such as PMMA, polycarbonate resin). The light guide plate 19 is a plate shaped member having a rectangular shape similar to the liquid crystal panel in the plan view. The light guide plate 19 is held in the chassis 14 such that a front surface 19a thereof is opposed to the liquid crystal panel 11 and aback surface 19b (an opposite surface) thereof is opposed to the reflection sheet 20.

The front surface 19a of the light guide plate 19 is configured as a light exiting surface 19a through which light rays exit toward the liquid crystal panel 11. The optical members 15 are supported by the frame 16 between the light exiting surface 19a and the liquid crystal panel 11. A first long end surface 19c of the light guide plate 19 is configured as a light entering surface 19c through which light rays from LEDs 17 enter. An end portion of the light guide plate 19 including the light entering surface 19c may be referred to as a light entering end portion 190.

A second long end surface 19d and two short end surfaces 19e and 19f of the light guide plate 19 are not opposed to the LEDs 17 and a light source (the LEDs 17). Therefore, second long end surface 19d and two short end surfaces 19e and 19f may be referred to as "light source non-opposed end surfaces." End portions 191, 192, and 193 including the light source non-opposed end surfaces may be referred to as "light source non-opposed end portions."

The short end surfaces 19e and 19f of the light guide plate 19 adjacent to the light entering surface 19c and not opposed to the LEDs 17 (the light source) may be referred to as "light source non-opposed adjacent end surfaces" and end portions 192 and 193 of the light guide plate 19 including the light source non-opposed adjacent end surfaces may be referred to as "light source non-opposed adjacent end portions."

The light source non-opposed end surface (the long end surface 19d) on the opposite side from the light entering surface 19c may be referred to as "an opposite-side light source non-opposed end surface" and an end portion 191 of the light guide plate 19 including the opposite-side light source non-opposed end surface may be referred to as "an opposite-side light source non-opposed end portion."

The frame 16 has a frame shape (a picture frame shape) as a whole to cover a peripheral portion of the light guide plate 19 from the front side. The frame 16 is fitted in an opening of the chassis 14. The frame 16 is made of synthetic resin and painted in white to have light reflectivity. The frame 16 includes a frame body 161 and projected walls 162.

The frame body 161 has a frame shape in the plan view. The frame body 161 includes an inner end portion held against the peripheral portion of the light guide plate 19 in the chassis 14 from the front side. The projected walls 162 project from the frame body 161 toward the bottom plate 14a of the chassis 14. The projected walls 162 are held in the chassis 14.

The frame body 161 has the frame shape such that the inner edge portion overlaps the peripheral portion of the light guide plate 19 and an outer edge portion overlaps upper ends of the sidewall plates 14b of the chassis 14. An elastic member 21 made of urethane foam is attached to a back surface of the inner edge portion of the frame body 161. The elastic member 21 in this embodiment is in black and has a light blocking property. The elastic member 21 has a frame shape (or a ring shape) as a whole. The elastic member 21 is brought into contact with the peripheral portion of the light guide plate 19 from the front side.

The inner edge portion of the frame body 161 is configured such that the front surface thereof is one step lower than the front surface of the outer edge portion. Edge portions of the optical members 15 are placed on the surface that is one step lower. The front surface of the inner end of the frame portion includes protrusions that are not illustrated. The end portions of the optical members 15 include holes in which the protrusions are fitted and the optical members 15 are supported by the frame body 161.

Each projected wall 162 has a plate shape that extends from the outer edge portion of the frame body 161 toward the bottom plate 14a of the chassis 14 to be opposed to the end surface 19c of the light guide plate 19. The LED board 18 on which the LEDs 17 are mounted are attached to a portion of the projected wall 162 opposed to the first long end surface 19c of the light guide plate 19. A portion of the projected wall 162 other than the portion to which the LED board 18 is attached is placed between the end surface of the light guide plate 19 and the sidewall plate 14b and held in the chassis 14.

The LEDs 17 (an example of a light source) include blue LED components (blue light emitting components), transparent sealing members, and cases. The blue LED components are light emitting sources each provided in the form of a chip. The sealing members seal the blue LED components. Each case has a substantially box shape holding the corresponding blue LED component and the respective sealing member. The LEDs 17 are configured to emit blue light rays. Each blue LED component is a semiconductor containing InGaN. When a forward voltage is applied, the blue LED component emits light rays in the blue wavelength range (about 420 nm to about 500 nm), that is, blue light rays. In this specification, the blue light rays emitted by the LEDs 17 may be referred to as primary light rays.

Figure 3:
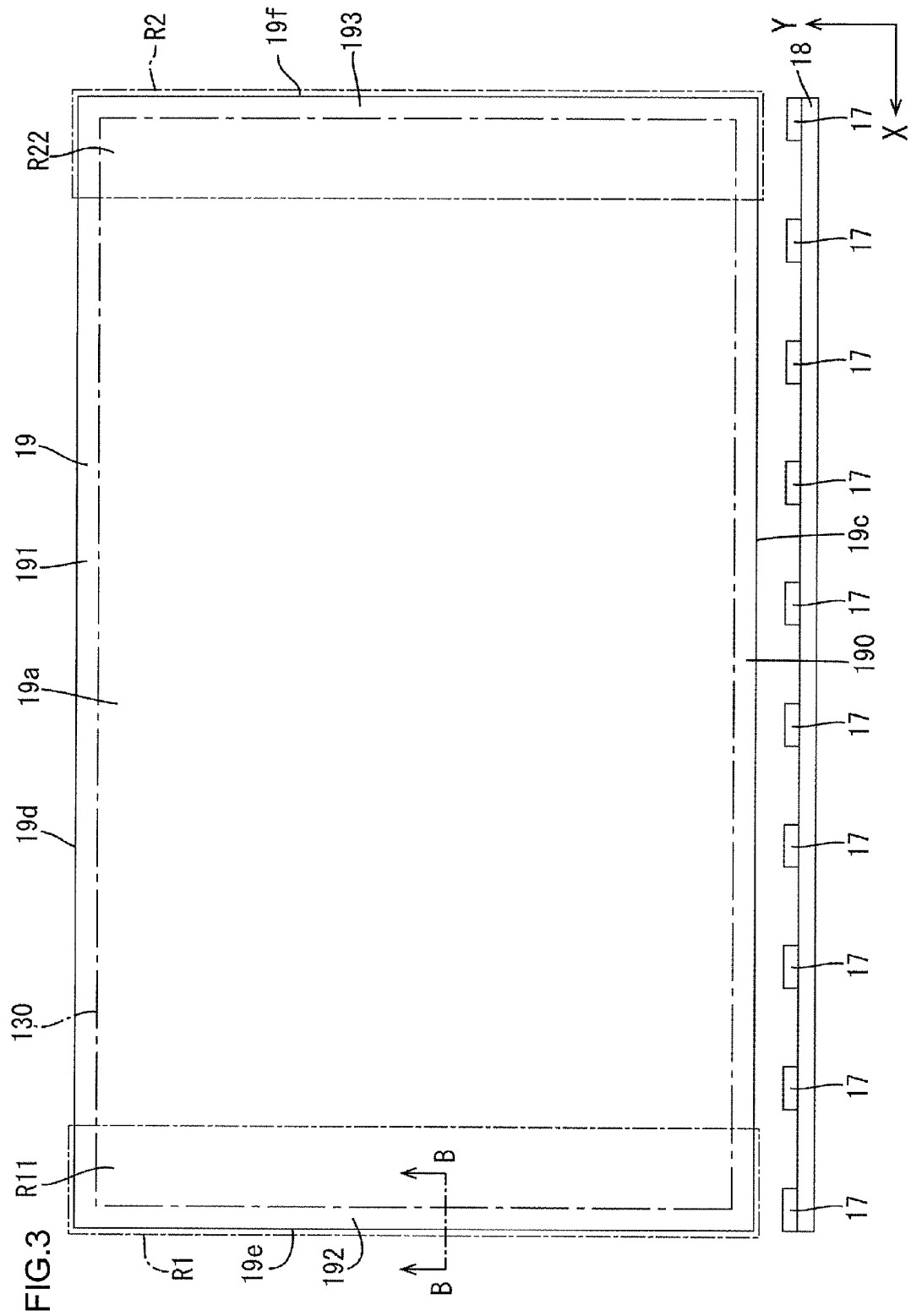
FIG. 3 is a plan view schematically illustrating a positional relationship between LEDs and a light guide plate viewed from a front side.

FIG. 3 is a plan view that schematically illustrates a positional relationship between the LEDs 17 and the light guide plate 19 viewed from the front side. The LEDs 17 are so-called top surface light emitting type LEDs and surface-mounted on a plate surface 18a of the LED board 18 having an elongated shape. The LEDs 17 are arranged at intervals in line and mounted on the LED board 18. The LEDs 17 mounted on the LED board 18 are attached to the projected wall 162 of the frame 16 such that the light emitting surfaces 18a are opposed to the first long end surface 19c (the light entering surface) of the light guide plate 19 and held in the chassis 14. The LEDs 17 are configured to emit light rays (blue light rays) to the light entering surface 19c of the light guide plate 19.

The optical members 15 have horizontally-long rectangular shapes in a plan view similar to the liquid crystal panel 11. The end portions of the optical members 15 are disposed between the light exiting surface 19a of the light guide plate 19 and the back surface of the liquid crystal panel 11 with the end portions placed on the frame body 161 of the frame 16 from the front side. The optical members 15 have functions for exerting predefined optical effects on the light rays exiting from the light guide plate 19 and directing the light rays toward the liquid crystal panel 11. The optical members 15 include multiple sheets that are placed in layers (optical sheets).

The sheets of the optical members 15 (the optical sheets) may be a diffuser sheet, a lens sheet, and a reflective type polarizing sheet. A mandatory member (the optical sheet) of the optical members 15 in this embodiment is a phosphor sheet 150 containing quantum dot phosphors (an example of a wavelength converting member) as a mandatory member (a mandatory optical sheet). The phosphor sheet 150 is disposed the closest to the light exiting surface 19a among the sheets of the optical members 15.

The phosphor sheet 150 will be described. The phosphor sheet 150 has a rectangular shape similar to the liquid crystal panel 11 in the plan view. The phosphor sheet 150 passes some of the light rays from the LEDs 17 in the thickness direction thereof. The phosphor sheet 150 absorbs some of the light rays from the LEDs 17, converts the light rays into light rays in a different wavelength range (secondary light rays), and releases the light rays. The phosphor sheet 150 includes a wavelength converting layer, a pair of supporting layers, and a pair of barrier layers. The supporting layers sandwich the wavelength converting layer. The barrier layers are formed on outer sides of the supporting layers to sandwich the wavelength converting layer and the supporting layers.

The wavelength converting layer contains an acrylic resin as a binder resin and the quantum dot phosphors (an example of first phosphors) dispersed in the acrylic resin. The acrylic resin is transparent and has light transmissivity. The acrylic resin has adhesiveness to the supporting layers. The supporting layers are sheets (or films) made of polyester based resin such as polyethylene terephthalate (PET).

The quantum dot phosphors are phosphors having high quantum efficiency. The quantum dot phosphors include semiconductor nanocrystals (e.g., diameters in a range from 2 nm to 10 nm) which tightly confine electrons, electron holes, or excitons with respect to all direction of a three dimensional space to have discrete energy levels. A peak wavelength of emitting light rays (a color of emitting light rays) is freely adjustable by changing the dot size.

In this embodiment, the wavelength converting layer includes green quantum dot phosphors and red quantum dot phosphors as quantum dot phosphors. The green quantum dot phosphors emit green light (in a wavelength range from about 500 nm to about 570 nm). The red quantum dot phosphors emit red light rays (in a wavelength range from about 600 nm to about 780 nm). An emitting light spectrum of the green light rays emitted by the green quantum dot phosphors and an emitting light spectrum of the red light rays emitted by the red quantum dot phosphors have sharp peaks, respectively. A half width of each peak is small, that is, purity of green and purity of red are very high and their color gamut is large.

The green quantum dot phosphors absorb the light rays from the LEDs 17 (the blue light rays, the primary light rays, exciting light rays). The green quantum dot phosphors are excited by the light rays and emit green light rays (in the wavelength range from about 500 nm to 570 nm). Namely, the green quantum dot phosphors have functions for converting the light rays from the LEDs 17 (the blue light rays, the primary light rays, the exciting light rays) to light rays in the different wavelength range (the green light rays, the secondary light rays).

The red quantum dot phosphors absorb the light rays from the LEDs 17 (the blue light rays, the primary light rays, exciting light rays). The red quantum dot phosphors are excited by the light rays and emit red light rays (in the wavelength range from about 600 nm to 780 nm). Namely, the red quantum dot phosphors have functions for converting the light rays from the LEDs 17 (the blue light rays, the primary light rays, the exciting light rays) to light rays in the different wavelength range (the red light rays, the secondary light rays).

Materials used for the quantum dot phosphors include a material prepared by combining elements that could be divalent cations such as Zn, Cd, and Pb and elements that could be divalent anions such as O, S, Se, and Te (e.g., cadmium selenide (CdCe), zinc sulfide (ZnS), a material prepared by combining elements that could be trivalent cations such as Ga and In and elements that could be trivalent anions such as P, As, and Sb (e.g., indium phosphide (InP), gallium arsenide (GaAs), and chalcopyrite type compounds (CuInSe2). In this embodiment, CdSe is used for the material of the quantum dot phosphors.

In this embodiment, the quantum dot phosphors (the green quantum dot phosphors and the red quantum dot phosphors) are evenly dispersed in the acrylic resin in the wavelength converting layer. The wavelength converting layer may contain other components such as a scattering agent.

The barrier layers are formed from metal oxide films such as alumina films and silicon oxide films. The barrier layers have functions for protecting the quantum dot phosphors in the wavelength converting layer from moisture (water) and oxygen. The barrier layers may be formed on the supporting layers by a vacuum deposition method.

Figure 4:
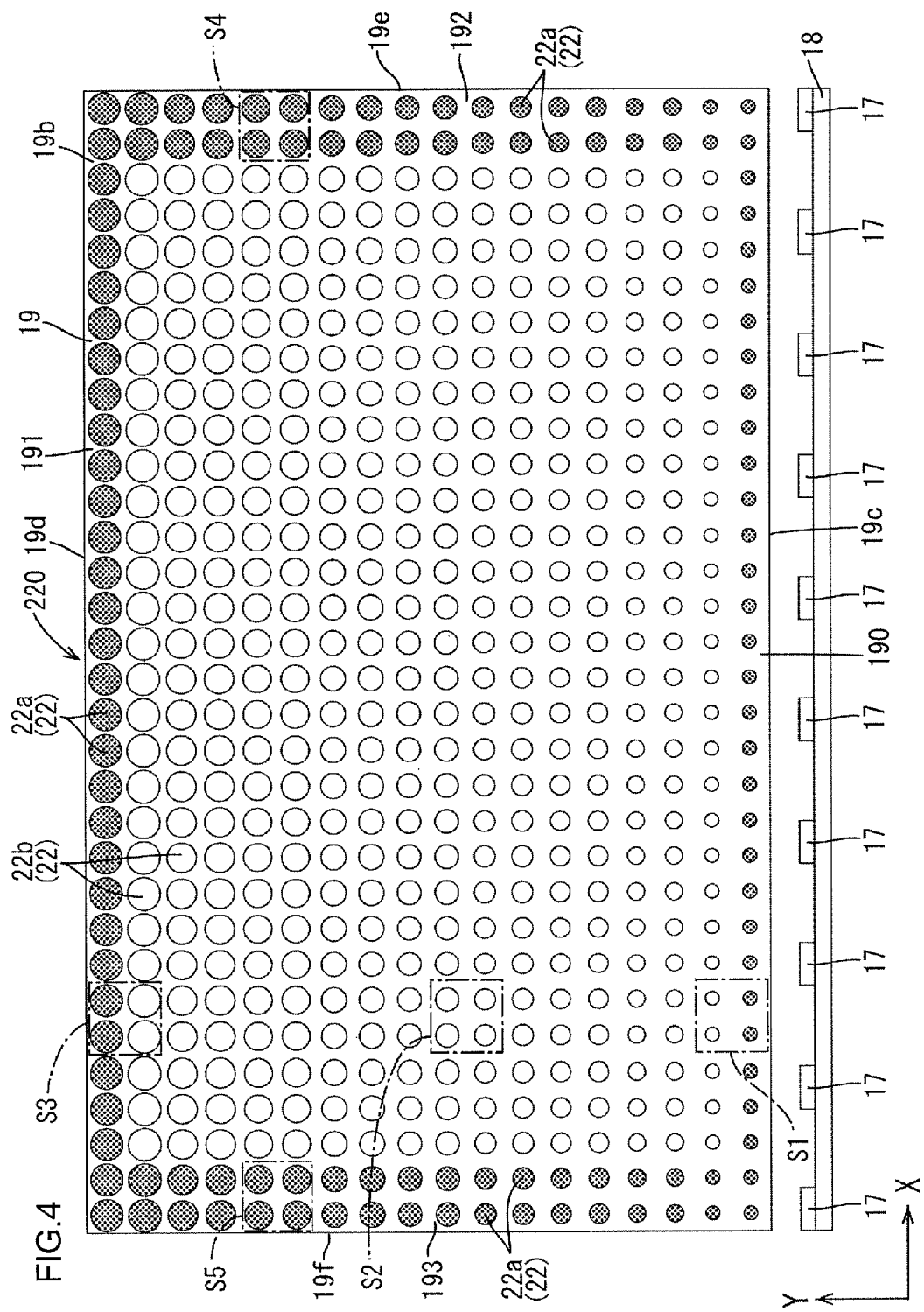
FIG. 4 is a magnified cross-sectional view schematically illustrating a positional relationship between LEDs and a light guide plate viewed from a rear side.

FIG. 4 is a plan view that schematically illustrates a positional relationship between the LEDs 17 and the light guide plate 19 viewed from the rear side. As illustrated in FIG. 4, a light reflecting and scattering pattern 220 is formed on the back surface 19b (the opposite surface) of the light guide plate 19.

The light reflecting and scattering pattern 220 has a function for reflecting or scattering the light rays in the light guide plate 19 and directing the light rays toward the light exiting surface 19a. The light reflecting and scattering pattern 220 includes dots 22 each having light reflectivity and a light scattering property. The dots 22 are formed in a predefined pattern to spread on the back surface 19b (the opposite surface) of the light guide plate 19. Each dot 22 has a round shape in a plan view.

The dots 22 in this embodiment are formed in end portions 190, 191, 192, and 193 of the light guide plate 19. The dots 22 include complementary color dots 22a and white dots 22b. The complementary color dots 22a are configured to absorb the primary light rays from the LEDs 17 (the blue light rays) and exhibit a color (yellow) which makes a complementary color pair with a reference color (blue) exhibited by the primary light rays (the blue light rays). The white dots 22b are formed inner than the complementary color dots 22a. The white dots 22b exhibit a white color.

Each dot 22 in this embodiment is prepared by forming paint with a coloring agent in the film shape (i.e., a paint film) on a resin base. The dots 22 are formed on the back surface 19*b* of the light guide plate 19 using a known printing technology such as screen printing and ink-jet printing. Pigments or dyes appropriate for a target color may be used for the coloring agent.

An yellow coloring agent (an example of a complementary color coloring agent) which absorbs the primary light rays from the LEDs 17 (the blue light rays) and exhibits a color (yellow) which makes a complementary color pair with the reference color (blue) exhibited by the primary light rays (the blue light rays) may be used for the coloring agent. Yellow pigments, yellow dyes, or yellow phosphors may be used for the yellow coloring agent. White pigments or white dyes may be used for the coloring agent for the white dots 22*b*.

The light reflecting and scattering pattern 220 is formed such that a density per unit area varies from area to area of the back surface 19*b* (the opposite surface) of the light guide plate 19. For example, as illustrated in FIG. 4, the light reflecting and scattering pattern 220 is formed such that the density per unit area on the back surface 19*b* (the opposite surface) gradually increases as a distance from the light entering surface 19*c* increases toward the opposite-side light source non-opposed end surface 19*d* side.

As illustrated in FIG. 4, the density of the dots 22 (of the light reflecting and scattering pattern 220) per unit area S1 in the area of the back surface 19*b* closer to the light entering surface 19*c* is low. The density of the dots 22 (of the light reflecting and scattering pattern 220) per unit area S3 in the area of the back surface 19*b* closer to the opposite-side light source non-opposed end surface 19*d* is high. The density of the dots 22 (of the light reflecting and scattering pattern 220) per unit area S2 in the area of the back surface 19*b* between the light entering surface 19*c* and the opposite-side light source non-opposed end surface 19*d* is higher than the density per unit area S1 and lower than the density per unit area S3.

The light reflecting and scattering pattern 220 is formed such that the density per unit area on the back surface 19*b* (the opposite surface) is higher on the end surface 19*d* side, the end surface 19*e* side, and the end surface 19*f* side (closer to the light source non-opposed end surfaces) of the light guide plate not opposed to the LEDs 17 (the light source) in comparison to the 1 the light entering surface 19*c* side. As illustrated in FIG. 4, the density of the dots 22 (the light reflecting and scattering pattern 220) per unit area S4 on the back surface 19*b* closer to the first light source non-opposed end surface 19*e* adjacent to the light entering surface 19*c* of the (i.e., the light source non-opposed adjacent end surface) is higher than the density per unit area S1. Furthermore, the density of the dots 22 (the light reflecting and scattering pattern 220) per unit area S5 on the back surface 19*b* closer to the second light source non-opposed end surface 19*f* adjacent to the light entering surface 19*c* of the (i.e., the light source non-opposed adjacent end surface) is higher than the density per unit area S1.

As described earlier, the density of the dots 22 (the light reflecting and scattering pattern 220) per unit area S3 on the back surface 19*b* closer to the opposite-side light source non-opposed end surface 19*d* is higher than the density per unit area S1.

The density of the light reflecting and scattering pattern 220 per unit area on the back surface 19*b* (sparseness and density) can be adjusted by properly setting sizes an d the number of the dots.

Figure 5:
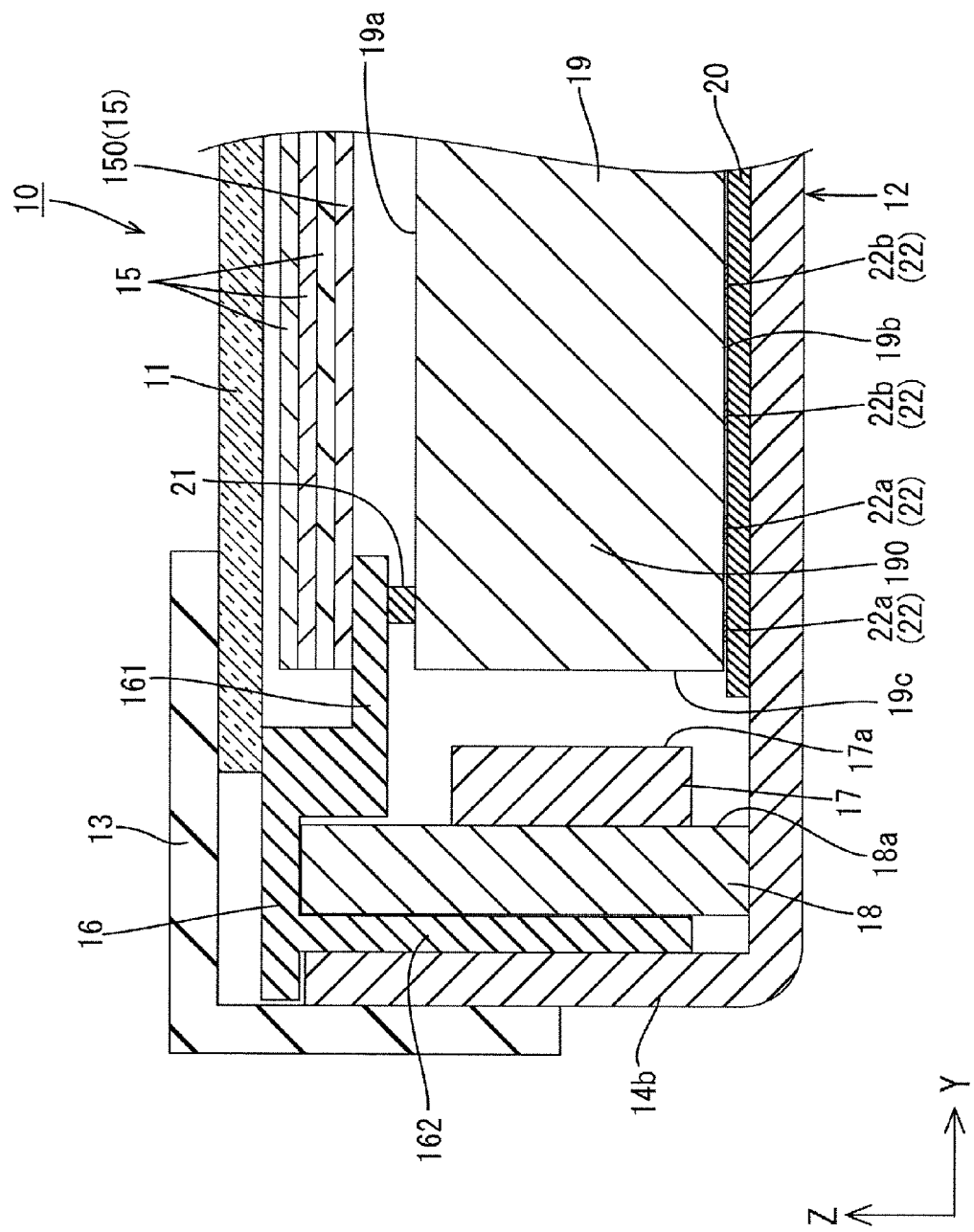
FIG. 5 is a magnified cross-sectional view of a portion of a liquid crystal display device including the LED and therearound.
Figure 6:
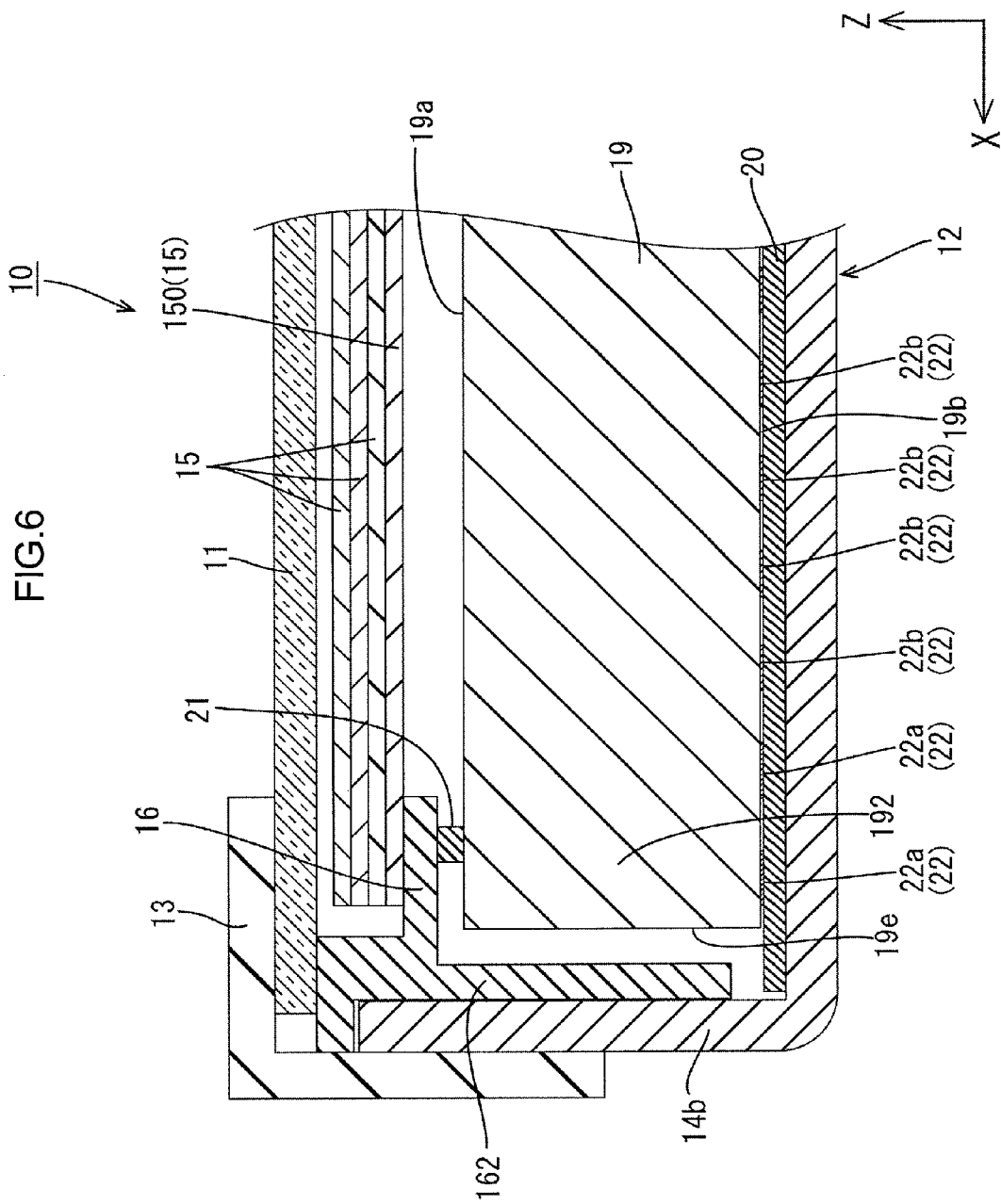
FIG. 6 is a magnified cross-sectional view of a portion of a liquid crystal display device including a light source non-opposed adjacent end surface and therearound.

FIG. 5 is a magnified cross-sectional view of a portion of the liquid crystal display device 10 including the LED 17 and therearound. FIG. 6 is a magnified cross-sectional view of a portion of the light source non-opposed adjacent end portion 192 and therearound. FIG. 6 illustrates the cross-sectional view along line B-B in FIG. 3.

A large number of light rays emitted by the LEDs 17 exist around the LEDs 17 (the light source) (closer to the light entering surface 19*c*). Even if the density of the dots 22 (the light reflecting and scattering pattern 220) per unit area closer to the light entering surface 19*c* is low, the sufficient number of light rays in the light guide plate 19 can be directed to the light exiting surface 19*a*.

The number of light rays supplied from the LEDs 17 to the light guide plate 19 tends to decrease as a distance from the LEDs 17 (the light source) in a direction toward the opposite side (the opposite-side light source non-opposed end surface 19*d* side) increases in comparison to the light entering surface 19*c* side or the center area of the back surface 19*b*. The number of light rays supplied from the LEDs 17 to the light guide plate 19 tends to be smaller around the light source non-opposed end surfaces 19*e* and 19*f* adjacent to the light entering surface 19*c* in comparison to the light entering surface 19*c* side or the center area of the back surface 19*c*. In such areas, the densities of the dots 22 (the light reflecting and scattering pattern 220) per unit area are set higher so that the sufficient number of light rays in the light guide plate 19 are directed to the light exiting surface 19*a*.

In this embodiment, the density of the dots 22 (the light reflecting and scattering pattern 220) per unit area is set higher in the area closer to the opposite-side light source non-opposed end surface 19*d* in comparison to the areas closer to the light source non-opposed adjacent end surfaces 19*e* and 19*f* on the back surface 19*b* of the light guide plate 19. Densities of complementary color dots 22*a* per unit area are set higher in the areas closer to the light source non-opposed adjacent end surfaces 19*e* and 19*f* in comparison to the area closer to the opposite-side light source non-opposed end surface 19*d*, which will be described later.

As illustrated in FIG. 4, the complementary color dots 22*a* of the light reflecting and scattering pattern 220 form a frame pattern to surround the white dots 22*b*.

In the light reflecting and scattering pattern 220, the complementary color dots 22*a* are formed on the back surface 19*b* along the end portions 190, 191, 192, and 193 of the light guide plate 19.

In this embodiment, the densities of the complementary color dots 22*a* per unit area are higher in the light source non-opposed adjacent end portions 192 and 193 in comparison to the opposite-side light source non-opposed end portion 191 and the light entering end portion 190. The density of the complementary color dots 22*a* per unit area is higher in the opposite-side light source non-opposed end portion 191 in comparison to the density of the complementary color dots 22*a* in the light entering end portion 190.

Some of the light rays (the primary light rays, the blue light rays) which have entered the light guide plate 19 through the light entering surface 19*c* reach the complementary color dots 22*a*. Some of the light rays that have reached the complementary color dots 22*a* are absorbed and the rest of the light rays are reflected or scattered by the complementary color dots 22*a*. When the light rays converted to the secondary light rays (the green light rays, the red light rays) through the wavelength conversion by the phosphor sheet 150 reach the complementary color dots 22*a*, the light rays are reflected or scattered by the complementary color dots 22*a*.

When the light rays (the primary light rays, the blue light rays) that have entered the light guide plate 19 through the light entering surface 19c or the secondary light rays after the wavelength conversion (the green light rays, the red light rays) reach the white dots 22b, the light rays are reflected or scattered by the white dots 22b.

In the lighting unit 12, when the power is supplied to the LEDs 17, the LEDs 17 are turned on and the light rays emitted by the LEDs 17 (the primary light rays, the blue light rays) enter the light guide plate 19 through the light entering surface 19c.

The light rays that have entered the light guide plate 19 are repeatedly reflected while traveling through the light guide plate 19. While traveling through the light guide plate 19, the light rays that have reached the light reflecting and scattering pattern 220 (the dots 22) on the back surface 19b are directed to the light exiting surface 19a and to the phosphor sheet 150 via the light exiting surface 19a.

As described earlier, some of the blue light rays pass through the phosphor sheet 150 without the wavelength conversion. Other blue light rays are converted to the yellow light rays and released. The light rays exiting from the phosphor sheet 150 (the blue light rays, the yellow light rays) may be retroreflected for several times by hitting other optical member 15 (the optical sheet) laid over the phosphor sheet 150 or the reflection sheet 20 on the back surface 19b side of the light guide plate 19. The light rays passing through the phosphor sheet 150 for several times exit from the optical members 15 and form planar light that travels toward the back surface of the liquid crystal panel 11.

FIG. 3 illustrates the light guide plate 19 viewed from the light exiting surface 19a side. The light rays exiting from areas R1 and R2 of the light exiting surface 19a having a rectangular shape closer to the short end surfaces 19e and 19f (light source non-opposed adjacent end surfaces) adjacent to the light entering surface 19c are retroreflected for the smaller number of times in comparison to the light rays exiting from the center area of the light exiting surface 19a.

The light rays reaching the center area of the light exiting surface 19a are mainly emitted by the LEDs 17 on an inner side among the LEDs 17 arranged in line. The light rays reaching the areas R1 and R2 on the left and the light side of the light exiting surface 19a are emitted by the LEDs 17 on outer sides among the LEDs 17 arranged in line.

Although the light rays emitted by the LEDs 17 spread out in a certain angle range, the light rays are more likely to travel straightforward. Therefore, the light rays emitted by the LEDs 17 on the inner side of the LED board 18 are less likely to reach the end portions of the light guide plate 19 (on the light source non-opposed adjacent end surface 19e side and the light source non-opposed adjacent end surface 19f side adjacent to the light entering surface 19c).

In FIG. 3, a line 130 (a chain line) drawing a rectangle along edges of the light exiting surface 19a indicates inner edges of the frame 16 (inner edges of the frame body 161). Some of the light rays exiting the light guide plate 19 through the light exiting surface 19a and actually reaching the liquid crystal panel 11 (i.e., the light rays exiting from the lighting unit 12) pass through the area inside the inner edges of the frame 16. When the light exiting side of the lighting unit 12 is viewed in plan, an area R11 surrounded by the line 130 and the area R1 and an area R22 surrounded by the line 130 and the area R2 are the areas from which the light rays that are retroreflected for the smaller number of times in comparison to the light rays exiting from the center area exit.

Although the areas of the light exiting surface 19a along the opposite-side light source non-opposed end surface 19d and the light entering surface 19c are significantly smaller than the areas R1 and R2 (the areas R11 and R22), the light rays exiting from those areas are retroreflected for the smaller number of times.

In this embodiment, the complementary color dots 22a of the light reflecting and scattering pattern 220 are arranged on the back surface 19b of the light guide plate 19 to overlap at least the areas from which the light rays that have retroreflected for the smaller number of times exit in the plan view.

When the light guide plate 19 is viewed in plan, the complementary color dots 22a that exhibit an yellow color are located within the areas R1 and R2. Namely, when the light guide plate 19 is viewed in plan, the complementary color dots 22a overlap the areas R1 and R2 that are larger than the areas R11 and R22.

The complementary color dots 22a that exhibit the yellow color are formed on the back surface 19b of the light guide plate 19 to overlap the area along the opposite-side light source non-opposed end surface 19d and the area along the light entering surface 19c.

If the light reflecting and scattering pattern 220 includes only the white dots 22b, the light supplied by the LEDs 17 and exiting from the areas R11 and R22 of the light guide plate 19 includes the higher percentage of the blue light rays in comparison to the light exiting from the center area. On the display surface of the liquid crystal panel 11, the end areas (corresponding to the areas R11 and R22, respectively) are more bluish than the center area.

Although the areas along the opposite-side light source non-opposed end surface 19d and the light entering surface 19c are significantly smaller than the areas R1 and R2 (the areas R11 and R22), the light exiting from those areas includes the higher percentage of the blue light rays in comparison to the center area.

In the lighting unit 12 in this embodiment, the light reflecting and scattering pattern 220 including the complementary color dots 22a and the white dots 22b that are formed in the predefined arrangement patterns on the back surface 19b of the light guide plate 19. The complementary color dots 22a absorb the primary light rays (the blue light rays). The complementary color dots 22a absorb the primary light rays (the blue light rays) as appropriate to increase the percentage of the light rays that exhibit the yellow that makes a complementary color pair with blue (the complementary color light rays) and to reduce the percentage of the light rays that exhibit blue (the blue light rays) in the areas R11 and R22 (the areas R1 and R2) of the light guide exiting surface 19a.

Therefore, whitish light exits from not only the center portion but also the end portions of the lighting unit 12. Namely, the planar light exiting from the lighting unit 12 is less likely to be tinted a color of the primary light from the LEDs 17 (blue) in the end portions (the light source non-opposed adjacent end portions 192 and 193) more than in the center portion.

Second Embodiment

Next, a second embodiment according to the present invention will be described with reference to FIG. 7. In this section, a lighting unit including a light reflecting and scattering pattern 220A instead of the light reflecting and scattering pattern 220 in the first embodiment will be described. A basic configuration of the lighting unit in this embodiment is similar to that of the first embodiment. Components similar to those of the first embodiment will be indicated by the same symbols as those indicating the components of the first embodiment and will not be described in detail.

Figure 7:
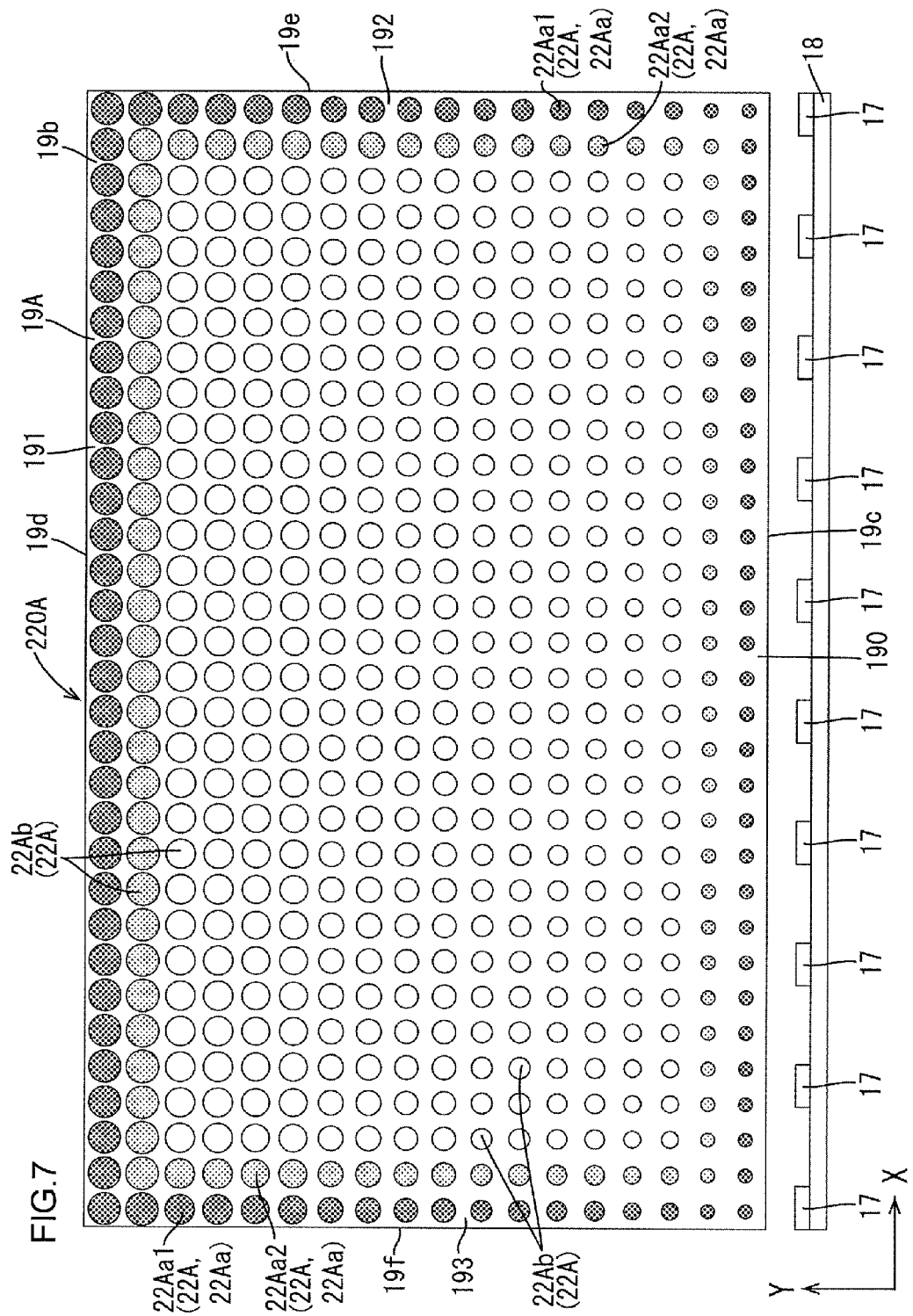
FIG. 7 is a plan view schematically illustrating a positional relationship between LEDs and a light guide plate in a lighting unit viewed from the rear side according to a second embodiment.

FIG. 7 is a plan view that schematically illustrates a positional relationship between the LEDs 17 and a light guide plate 19A viewed from the rear side in the lighting unit in the second embodiment. The light guide plate 19A in this embodiment includes the light reflecting and scattering pattern 220A formed on the back surface 19b (the opposite surface) is different from the light guide plate 19 in the first embodiment. Other configurations are similar to those of the first embodiment.

As illustrated in FIG. 7, the light reflecting and scattering pattern 220A includes dots 22A that include complementary color dots 22Aa that exhibit an yellow color and white dots 22Ab that exhibit a white color similar to the first embodiment. The arrangement pattern of the dots 22A formed on the back surface 19b (densities per unit area) is similar to that of the first embodiment.

The complementary color dots 22Aa are arranged along end portions 190, 191, 192, and 193 of the light guide plate 19A to form a frame pattern on the back surface 19b similar to the first embodiment. The white dots 22Ab are arranged inner than the complementary color dots 22Aa arranged in the frame pattern.

The complementary color dots 22Aa in this embodiment are provided in a color (yellow) which makes a complementary color pair with the reference color (blue) with a tone that gradually changes from deep to light in directions from edges of the back surface 19b (the opposite surface) toward the center of the back surface 19b. As illustrated in FIG. 7, the complementary color dots 22Aa include outer complementary color dots 22Aa1 and inner complementary color dots 22Aa2. The outer complementary color dots 22Aa1 are arranged in a frame pattern along the outer edges of the back surface 19b. The outer complementary color dots 22Aa1 exhibit relatively deep yellow. The inner complementary color dots 22Aa2 are arranged inner than the outer complementary color dots 22Aa1 and in a frame pattern to surround the white dots 22Ab. The inner complementary color dots 22Aa2 exhibit relatively light yellow.

If the light reflecting and scattering pattern 220A includes only the white dots 22Ab, light exiting from the areas R11 and R22 of the light guide plate 19A (see the light guide plate 19 in the first embodiment in FIG. 3) includes a higher percentage of the blue light rays in comparison to light exiting from the center area. The percentage of the blue light rays tends to increase as distances from the edges of the light guide plate 19A decrease. Namely, on the display surface of the liquid crystal panel 11, sections of the end portions (corresponding to the areas R11 and R22) the closest to the edges are more bluish.

In this embodiment, the complementary color dots 22Aa are provided in the color (yellow) with the tone that gradually change from deep to light in directions from the edges of the back surface 19b (the opposite surface) toward the center of the back surface 19b. According to the configuration, efficiency in absorption of the primary light rays (the blue light rays) by the complementary color dots 22Aa can be controlled according to the percentage of the blue light rays. Planar light exiting from the lighting unit including such a light guide plate 19A is less likely tinted the color of the primary light rays (blue) from the LEDs 17 in the end portions (e.g., the light source non-opposed adjacent end portions 192 and 193) more than in the center portion.

Other Embodiments

The present invention is not limited to the above embodiments described in the above sections and the drawings. For example, the following embodiments may be included in technical scopes of the technology.

(1) In each of the above embodiments, one of the long end surfaces among the end surfaces of the light guide plate is configured as the light entering surface. The present invention is not limited to such a configuration. For example, two long end surfaces may be configured as light entering surfaces. Alternatively, one of two short end surfaces may be configured as light entering surfaces.

(2) In each of the above embodiments, each of the dots in the light reflecting and scattering pattern has the round shape in the plan view. However, each of the dots may have another shape such as a polygonal shape, an oval shape, and an irregular shape.

(3) In each of the above embodiments, the complementary color dots are formed to exhibit the color (yellow) which makes the complementary color pair with the reference color (blue light rays) exhibited by the primary light rays for an entire area. However, the dots may be formed such that some of the dots exhibit the color (yellow) which makes the complementary color pair with the reference color (the blue light rays) and the rest of the dots exhibit a white color.

Figure 8:
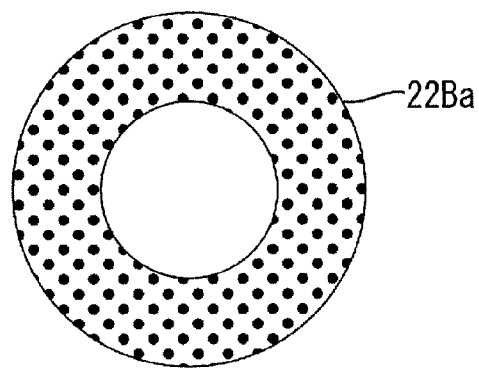
FIG. 8 is a view of a complementary color dot in a first modification.
Figure 9:
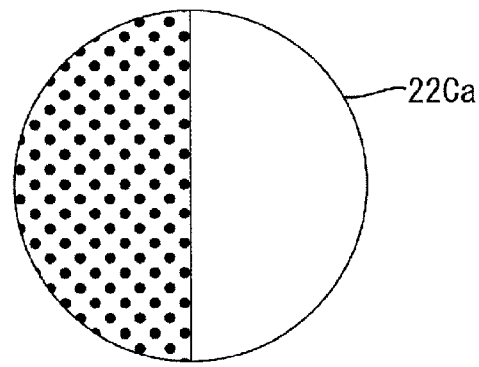
FIG. 9 is a view of a complementary color dot in a second modification.
Figure 10:
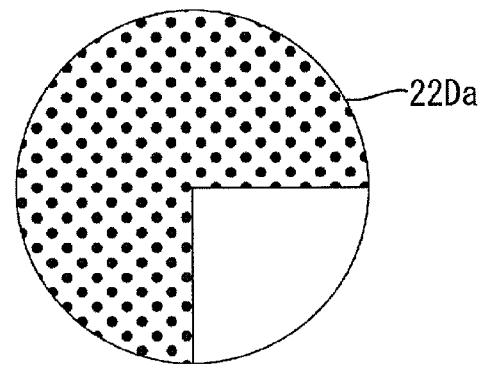
FIG. 10 is a view of a complementary color dot in a third modification.

For example, each complementary color dot may have a white center portion and an annular portion that surrounds the center portion as a complementary color dot 22Ba of a first modification illustrated in FIG. 8. The annular portion may exhibit a color (yellow) which makes a complementary color pair with the reference color (the blue light rays). Each complementary color dot may have semicircular portions, one of which exhibits a white color and the other one of which exhibits a color (yellow) which makes a color that makes a complementary color pair with the reference color (blue) as a complementary color dot 22Ca of a second modification illustrated in FIG. 9. Each complementary color dot may have quadrant portions, one of which (a quarter portion) exhibits a white color and the rest of which (a three-quarter portion) exhibit a color (yellow) which makes a color that makes a complementary color pair with the reference color (blue) as a complementary color dot 22Da of a third modification illustrated in FIG. 10. As the above modifications, complementary color dots may be configured to partially exhibit the color (yellow) that makes the complementary color pair with the reference color (blue) to adjust density of the complementary color dots per unit area.

Figure 11:
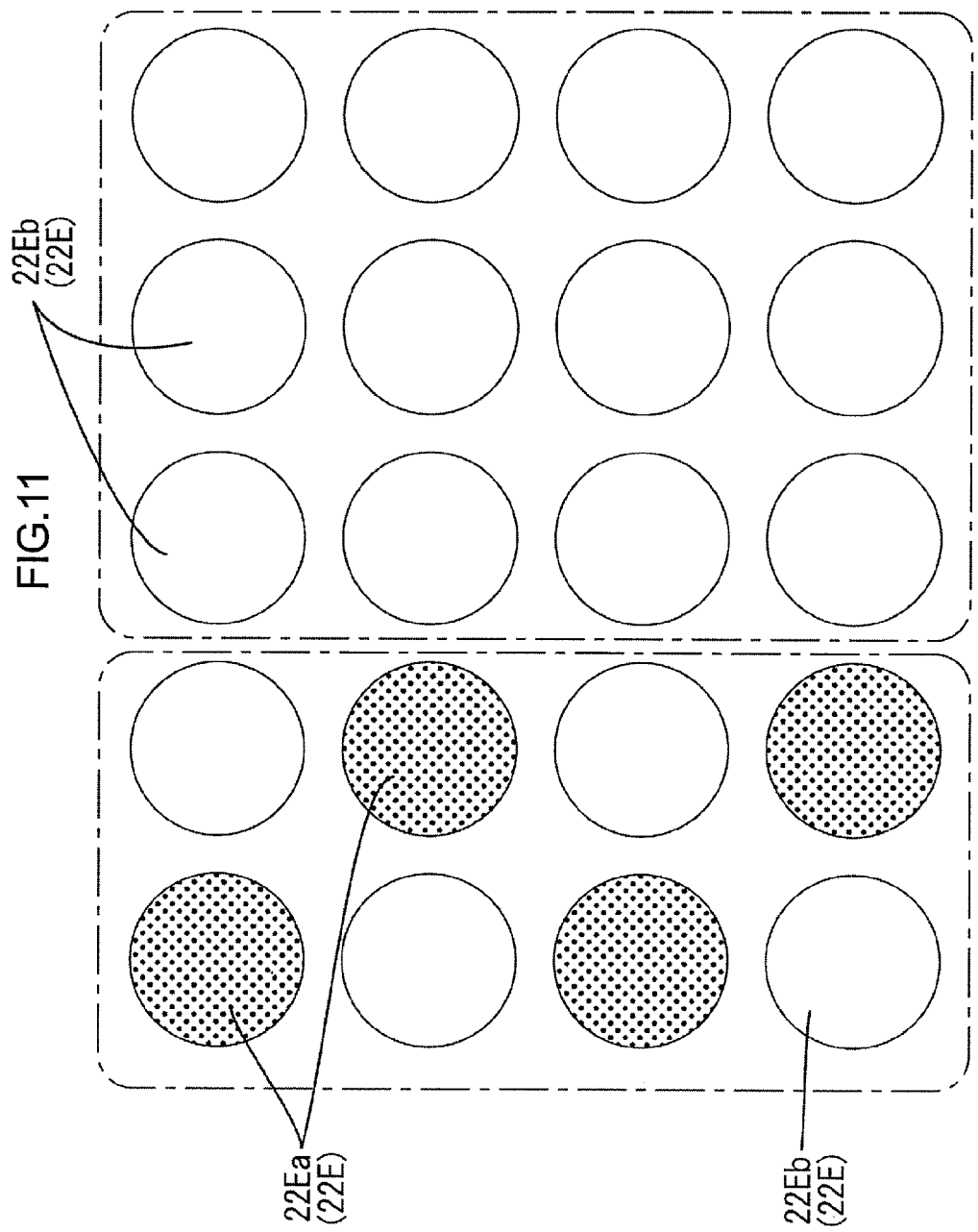
FIG. 11 is a view of a light reflecting and scattering pattern according to another embodiment.

(3) In each of the above embodiments, all the white dots among the dots included in the light reflecting and scattering pattern are arranged inner of the light guide plate than the complementary color dots. However, the white dots may be arranged between the complementary color dots arranged adjacent to one another as long as the object of the present invention can be achieved. FIG. 11 illustrates a portion of a light reflecting and scattering pattern according to another embodiment. As illustrated in FIG. 11, white dots Eb are arranged between complementary color dots 22Ea that are arranged adjacent to one another. The density of the complementary color dots 22Ea per unit area may be adjusted by arranging the dots 22E as described above.

Figure 12:
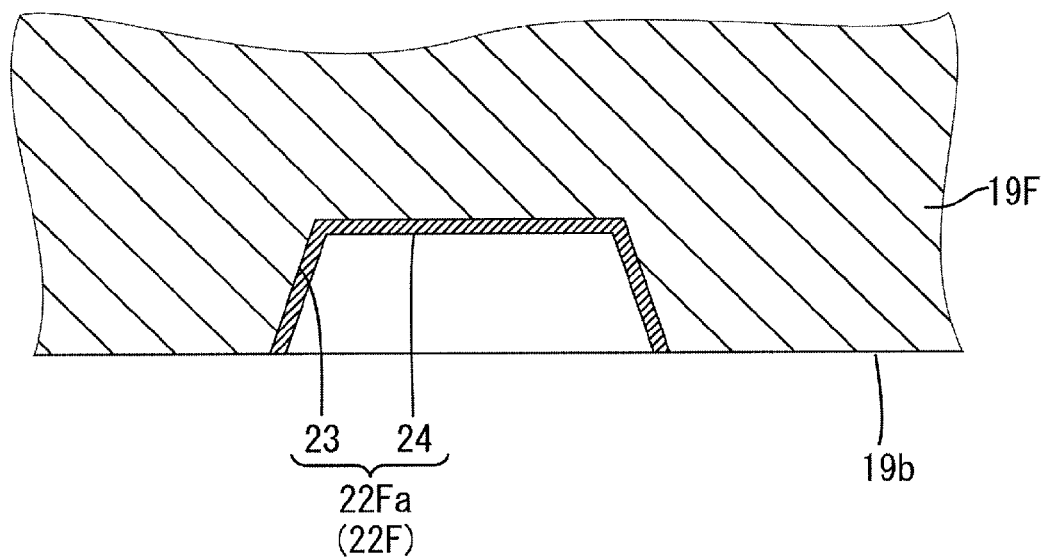
FIG. 12 is a cross-sectional view of a complementary color dot in another embodiment.

(4) In each of the above embodiments, each dot included in the light reflecting and scattering pattern is formed from the film containing the predefined coloring agent. However, dots having other configuration may be used as long as the object of the present invention can be achieved. For example, a dot 22F illustrated in FIG. 12 is a recess 23 formed in a dot shape in a back surface 19b (an opposite surface) of a light guide plate 19F through debossing. The complementary color dot 22Fa is prepared by applying a paint 24 (a paint film) which absorbs primary light rays and exhibits a color (yellow) which makes a complementary color pair with a reference color exhibited by the primary light rays to an inner surface of the recess 23. The recess 23 is only a type of dots included in the white dots. The dots 22F may be formed from the recesses 23.

(5) In each of the above embodiments, the LEDs configured to emit a single color of blue light rays are used for the light source configured to emit the primary light rays. However, LEDs configured to emit light rays in a color other than blue for the light source. For example, LEDs configured to emit magenta light rays as primary light rays may be used. In this case, green phosphors may be used for the phosphors contained in the phosphor sheet (the wavelength converting member) to emit white light from the lighting unit. In this case, the complementary color dots may be configured to exhibit green.

(6) Other than above (5), LEDs configured to emit violet light rays as primary light rays may be used. In this case, yellow phosphors and green phosphors with a predefined ratio may be used for the phosphors contained in the phosphor sheet (the wavelength converting member) to emit white light from the lighting unit. In this case, the complementary color dots may be configured to exhibit a color that makes a complementary color pair with violet.

(7) Other than above (5) and (6), LEDs configured to emit cyan light rays as primary light rays may be used for the light source. In this case, red phosphors may be used for the phosphors contained in the phosphor sheet (the wavelength converting member) to emit white light from the lighting unit. In this case, the complementary color dots may be configured to exhibit a color (red) which makes a complementary color pair with cyan.

(8) The kinds and the sequence of the layers of the optical members (the optical sheets) may be altered as appropriate.

(9) The kinds and the sequence of the layers of the phosphor sheet (the wavelength converting member) may be altered as appropriate.

(10) The quantum dot phosphors contained in the phosphor sheet (the wavelength converting member) may be the core-shell type phosphors or core type quantum dot phosphors each having a single internal composition may be used.

(11) In each of the above embodiments, the quantum dot phosphors are contained in the phosphor sheet (a wavelength converting member). However, other type of phosphors may be contained in the phosphor sheet (the wavelength converting member). For example, sulfide phosphors may be contained in the optical sheet (the wavelength converting member). Specifically, $SrGa_2S_4:Eu^{2+}$ may be used for the green phosphors and $(Ca, Sr, Ba)S:Eu^{2+}$ may be used for the red phosphors.

(12) Other than the above (11), $(Ca, Sr, Ba)_3SiO_4:Eu^{2+}$, $\beta$-SiAlON:$Eu^{2+}$, or $Ca_3Sc_2Si_3O_{12}:Ce^{3+}$ may be used for the green phosphors contained in the phosphor sheet (the wavelength converting member). $(Ca, Sr, Ba)_2SiO_5N_8:Eu^{2+}$ or $CaAlSiN_3:Eu^{2+}$ may be used for the red phosphors contained in the phosphor sheet (the wavelength converting member). $(Y, Gd)_3 (Al, Ga)_5O_{12}:Ce^{3+}$ (so-called YAG: $Ce^{3+}$), $\alpha$-SiAlON:$Eu^{2+}$, or $(Ca, Sr, Br)_3SiO_4:Eu^{2+}$ may be used for the yellow phosphors contained in the phosphor sheet (the wavelength converting member). Other than the above, a complex fluoride fluorescent material (e.g., manganese-activated potassium fluorosilicate ($K_2TiF_6$)) may be used for the phosphors contained in the phosphor sheet (the wavelength converting member).

(13) Other than the above (11) and (12), organic phosphors may be used for the phosphors contained in the phosphor sheet (the wavelength converting member). The organic phosphors may be low molecular organic phosphors including triazole or oxadiazole as a basic skeleton.

(14) Other than the above (11), (12), and (13), phosphors configured to convert wavelengths through energy transfer via dressed photons (near-field light) may be used for the phosphors contained in the phosphor sheet (the wavelength converting member). Preferable phosphors of this kind may be phosphors including zinc oxide quantum dots (ZnO-QD) with diameters from 3 nm to 5 nm (preferably about 4 nm) and DCM pigments dispersed in the zinc oxide quantum dots.

(15) Other than the above embodiments, the emission spectrum of the LEDs (peak wavelengths, half width of each peak) and the emission spectrum of the phosphors contained in the phosphor layer (peak wavelengths, half width of each peak) may be altered as appropriate.

(16) In each of the above embodiments, InGaN is used for the material of the LED components in the LEDs. However, GaN, AlGaN, GaF, ZnSe, ZnO, or AlGaInP may be used for the material of the LED components.

(17) In each of the above embodiments, the chassis 14 is made of metal. However, a chassis made of resin may be used.

(18) In each of the above embodiments, the LEDs are used for the light source. However, other types of light sources such as organic ELs may be used.

(19) In each of the above embodiments, the liquid crystal panel and the chassis are in the upright position with the short-side directions corresponding with the vertical direction. However, the liquid crystal panel and the chassis may be in the upright portion with the long-side directions corresponding with the vertical direction.

(20) In each of the above embodiments, the TFTs are used for the switching components of the liquid crystal display device. However, the present invention can be applied to a liquid crystal display device including switching components other than the TFTs (e.g., thin film diodes (TFD)). Furthermore, the present invention can be applied to a black-and-white liquid crystal display other than the color liquid crystal display.

(21) In each of the above embodiments, the transmissive type liquid crystal display device is provided. However, the present invention can be applied to a reflective type liquid crystal display device or a semitransmissive type liquid crystal display device.

(22) In each of the above embodiments, the liquid crystal display device including the liquid crystal panel as a display panel is provided. However, the present invention can be applied to display devices including other types of display panels.

(23) In each of the above embodiments, the television device including the tuner is provided is provided. However, the present invention can be applied to a display device without a tuner. Specifically, the present invention can be applied to a liquid crystal display panel used in a digital signage or an electronic blackboard.

(24) In each of the above embodiments, the lighting unit is configured to emit the white planar light. However, the present invention is not limited to such a configuration. For example, the lighting unit may be configured to emit planar light tinted a warm color such as red and orange or another color.

EXPLANATION OF SYMBOLS

10: Liquid crystal display device (display device)
12: Lighting unit (backlight unit)

13: Bezel
14: Chassis
15: Optical member
150: Phosphor sheet (wavelength converting member)
16: Frame
17: LED (light source)
18: LED board
19: Light guide plate
19a: Light exiting surface
19b: Back surface
19c: Light entering surface
20: Reflection sheet (reflecting member)
21: Elastic member
220: Light reflecting and scattering pattern
22: Dots
22a: Complementary color dots
22b: White dots

The invention claimed is:

1. A lighting device comprising:
   a light source configured to emit primary light rays in a predefined wavelength range;
   a light guide plate comprising:
      a light entering surface opposed to the light source and through which the primary light rays from the light source enter;
      a light exiting surface through which the primary light rays that have entered through the light entering surface exit;
      an opposite surface disposed on an opposite side from the light exiting surface; and
      a light reflecting and scattering pattern including a plurality of dots having light reflectivity and light scattering properties and being formed on the opposite surface to spread on the opposite surface, the plurality of dots including:
         a plurality of complementary color dots formed in edge areas of the opposite surface and configured to absorb the primary light rays and exhibit a color that makes a complementary color pair with a reference color exhibited by the primary light rays; and
         a plurality of white dots formed inner of the opposite surface than the complementary color dots and configured to exhibit a white color; and
   a wavelength converting member containing phosphors configured to emit secondary light rays in a wavelength range different from the wavelength range when excited by the primary light rays, the wavelength converting member being disposed to cover the light exiting surface and configured to pass some of the primary light rays to emit planar light.

2. The lighting device according to claim 1, wherein the light reflecting and scattering pattern is formed such that a density per unit area on the opposite surface gradually increases as a distance from the light entering surface increases.

3. The lighting device according to claim 1, wherein the light reflecting and scattering pattern is formed such that a density per unit area is higher on a light source non-opposed end surface side closer to a light source non-opposed end surface that is an end surface of the light guide plate not opposed to the light source than on light entering surface a side.

4. The lighting device according to claim 1, wherein the plurality of complementary color dots are provided in a color that makes a complementary color pair with the reference color with a tone that gradually changes from deep to light in directions from edges of the opposite surface toward a center of the opposite surface.

5. The lighting device according to claim 1, wherein the plurality of complementary color dots are formed on the opposite surface along edges of the light guide plate.

6. The lighting device according to claim 1, wherein the plurality of complementary color dots are formed on the opposite surface along light source non-opposed adjacent end portions including light source non-opposed adjacent end surfaces that are not opposed to the light source and adjacent to the light entering surfaces.

7. The lighting device according to claim 1, wherein the plurality of complementary color dots are arranged in a frame pattern to surround the plurality of white dots.

8. The lighting device according to claim 1, wherein the plurality of complementary color dots are configured to exhibit a color that makes a complementary color pair with the reference color for an entire area or a partial area.

9. The lighting device according to claim 1, wherein
   each of the dots of the light reflecting and scattering pattern includes a paint film that contains a coloring agent, and
   each the complementary color dots includes a complementary coloring agent that absorbs the primary light rays and exhibits a color that makes a complementary color pair with a reference color exhibited by the primary light rays.

10. The lighting device according to claim 1, wherein
    the dots of the light reflecting and scattering pattern are recesses in dot shapes formed in the opposite surface of the light guide plate, and
    the complementary color dots include the recesses with paints that absorb the primary light rays and exhibit a color that makes a complementary color pair with a reference color exhibited by the primary color rays.

11. The lighting device according to claim 1, wherein
    the primary color rays are blue light rays,
    the wavelength converting member includes at least green phosphors and red phosphors as the phosphors, the green phosphors being configured to emit green light rays as the secondary light rays when excited by the blue light rays that are the primary light rays, the red phosphors being configured to emit red light rays as the secondary light rays when excited by the blue light rays that are the primary light rays, and
    the complementary dots are configured to exhibit an yellow color.

12. The lighting device according to claim 1, further comprising a reflective type polarizing member disposed to cover the wavelength converting member.

13. A display device comprising:
    the lighting device according to claim 1; and
    a display panel configured to display an image using light from the lighting device.

14. The display device according to claim 13, wherein the display panel is a liquid crystal display panel.

15. A television device comprising the display device according to claim 13.

* * * * *